(12) United States Patent
Xu et al.

(10) Patent No.: US 12,502,029 B2
(45) Date of Patent: Dec. 23, 2025

(54) AIR FRYER

(71) Applicant: GUANGDONG MIDEA CONSUMER ELECTRICS MANUFACTURING CO., LTD., Foshan (CN)

(72) Inventors: Zhibo Xu, Foshan (CN); Huayong Liu, Foshan (CN); Zujing Du, Foshan (CN); Liang Yao, Foshan (CN); Huimin Wu, Foshan (CN); Fufeng Xiao, Foshan (CN)

(73) Assignee: GUANGDONG MIDEA CONSUMER ELECTRICS MANUFACTURING CO., LTD., Foshan (CN)

( * ) Notice: Subject to any disclaimer, the term of this patent is extended or adjusted under 35 U.S.C. 154(b) by 828 days.

(21) Appl. No.: 17/772,131

(22) PCT Filed: Sep. 1, 2020

(86) PCT No.: PCT/CN2020/112894
§ 371 (c)(1),
(2) Date: May 25, 2022

(87) PCT Pub. No.: WO2021/143153
PCT Pub. Date: Jul. 22, 2021

(65) Prior Publication Data
US 2022/0400896 A1     Dec. 22, 2022

(30) Foreign Application Priority Data

Jan. 17, 2020   (CN) .......................... 202010054166.7

(51) Int. Cl.
*A47J 37/06*     (2006.01)
(52) U.S. Cl.
CPC ................................ *A47J 37/0641* (2013.01)

(58) Field of Classification Search
CPC ...... A47J 37/0641; A47J 45/071; A47J 36/20; A47J 27/04; A47J 37/043; A47J 37/0786; A47J 2037/0795; A47J 27/08; A47J 27/09; A47J 27/0806; A47J 27/004; A47J 43/0777
USPC .......... 219/441, 492, 494, 435; 99/447, 333, 99/348, 353, 403, 407, 409, 410, 411, 99/413, 415, 423, 485, 505, 508
See application file for complete search history.

(56) References Cited

U.S. PATENT DOCUMENTS

2015/0201806 A1*  7/2015  Yoshidome ........... A47J 27/004
                                                          99/447
2018/0303285 A1* 10/2018  Cheng ..................... A47J 36/16

FOREIGN PATENT DOCUMENTS

| CN | 201879514 U | 6/2011 |
| CN | 102824115 A | 12/2012 |
| CN | 104207657 A | 12/2014 |
| CN | 205197818 U | 5/2016 |

(Continued)

OTHER PUBLICATIONS

First OA for CN application 202010054166.7 mailed Jan. 10, 2022.
(Continued)

*Primary Examiner* — Phuong T Nguyen
(74) *Attorney, Agent, or Firm* — K&L Gates LLP (57) ABSTRACT

An air fryer includes a housing, in which a cooking cavity and a heating cavity are formed, the heating cavity being located behind the cooking cavity; a heating device, which is arranged in the housing to heat the cooking cavity; and a food container, which is placed inside the cooking cavity.

19 Claims, 11 Drawing Sheets

(56) References Cited

FOREIGN PATENT DOCUMENTS

| CN | 107485302 A | 12/2017 |
|---|---|---|
| CN | 206809173 U | 12/2017 |
| CN | 108245037 A | 7/2018 |
| CN | 207652198 U | 7/2018 |
| CN | 108903679 A | 11/2018 |
| CN | 208755752 U | 4/2019 |
| CN | 208755759 U | 4/2019 |
| CN | 208876243 U | 5/2019 |
| CN | 208909866 U | 5/2019 |
| CN | 209346742 U | 9/2019 |
| CN | 209826374 U | 12/2019 |
| EP | 3581075 A1 | 12/2019 |
| JP | 2013062035 A | 4/2013 |
| WO | 2014195129 A1 | 12/2014 |
| WO | 2015086477 A1 | 6/2015 |

OTHER PUBLICATIONS

ISR for PCT application PCT/CN2020/112894 mailed Dec. 3, 2020.
Second OA mailed Jul. 22, 2022 for CN application 202010054166.7.
Search Report received in EP application No. 20913642.3; mailed Nov. 29, 2022.
OA received in AU application No. 2020421883; mailed Aug. 9, 2023.

* cited by examiner

AIR FRYER

CROSS-REFERENCES TO RELATED APPLICATIONS

The present disclosure is a national phase application of International Application No. PCT/CN2020/112894, filed on Sep. 1, 2020, which claims priority to Chinese Patent Application Serial No. 202010054166.7, filed on Jan. 17, 2020, the entire content of which is incorporated herein by reference.

FIELD

The present application relates to the field of electric appliance manufacturing technologies, and more particularly to an air fryer.

BACKGROUND

The air fryers rapidly crisp food surface by using hot air, and lock moisture inside the food, to achieve cooking effect of crispy outside and tender inside. The cooking taste of deep frying is realized without adding oil.

In the air fryers of the related art, a fan is arranged above a frying basket to circulate hot air through the entire cooking space. However, lots of space in an up-and-down direction needs to be occupied, which cannot meet some users' requirements for the kitchen space.

To this end, some air fryers employ the frying basket and the fan arranged in a front-and-rear direction. However, the hot air is difficult to evenly circulate in the frying basket, affecting the cooking effect.

SUMMARY

Embodiments of the present application seek to solve at least one of the problems existing in the related art. To this end, the present application proposes an air fryer which has some embodiments configured for even heating, good cooking effect, etc.

In order to achieve the above purpose, embodiments of the present application propose an air fryer, which includes a housing defining a cooking cavity and a heating cavity, the heating cavity being located behind the cooking cavity; a heating device arranged in the housing to heat the cooking cavity; and a food container configured to receive food to be fried, the food container being adapted to be placed in the cooking cavity.

The air fryer according to embodiments of the present application has the embodiments configured for even heating, good cooking effect, etc.

Additionally, the air fryer according to embodiments of the present application may further have the following additional embodiments.

According to an embodiment of the present application, the heating cavity has a lower portion provided with a heating-cavity air outlet, the food container has a rear end provided with an air guiding edge, and when the food container is placed in the cooking cavity, the air guiding edge is located below the heating-cavity air outlet to guide airflow from the heating-cavity air outlet to the food container.

According to an embodiment of the present application, the air guiding edge obliquely extends rearwards and upwards in a front-and-rear direction.

According to an embodiment of the present application, a ratio of a length of the air guiding edge in the front-and-rear direction to a height of the air guiding edge in an up-and-down direction is 2~4.

According to an embodiment of the present application, the ratio of the length of the air guiding edge in the front-and-rear direction to the height of the air guiding edge in the up-and-down direction is 2.5~3.5.

According to an embodiment of the present application, the air guiding edge 310 extends rearwards and upwards in an arc shape, and a minimum angle between a tangent line at a rear end of the air guiding edge and a horizontal direction is 45~90 degrees.

According to an embodiment of the present application, the air guiding edge 310 extends rearwards and upwards in an arc shape, and a minimum angle between a tangent line at a rear end of the air guiding edge and a horizontal direction is 50~70 degrees.

According to an embodiment of the present application, the air guiding edge 310 extends rearwards and upwards in an arc shape, and a minimum angle between a tangent line at a rear end of the air guiding edge and a horizontal direction is 60 degrees.

According to an embodiment of the present application, the heating device includes a heating member and a hot air fan, and the heating cavity has a front surface provided with a heating-cavity air inlet.

According to an embodiment of the present application, the heating-cavity air outlet includes a plurality of sub air outlets spaced apart in a left-and-right direction.

According to an embodiment of the present application, each sub air outlet is provided with an air blocking piece extending upwards.

According to an embodiment of the present application, the air blocking piece is located at a left edge or a right edge of each sub air outlet.

According to an embodiment of the present application, the heating device includes a heating member and a hot air fan, the hot air fan rotates clockwise when viewed from rear to front, the air blocking piece is located at the left edge of each sub air outlet; or the hot air fan rotates clockwise when viewed from front to rear, the air blocking piece is located at the right edge of each sub air outlet.

According to an embodiment of the present application, a length of each air blocking piece in a vertical direction increases gradually from inside to outside.

According to an embodiment of the present application, the heating device includes a heating member and a hot air fan, and the heating cavity include: a vertical portion, the heating-cavity air outlet being defined in a lower surface of the vertical portion; and a circular portion located above the vertical portion and coupled to the vertical portion, the heating member and the hot air fan being arranged in the circular portion.

According to an embodiment of the present application, a central axis of the hot air fan and a central axis of the circular portion are misaligned.

According to an embodiment of the present application, the hot air fan rotates clockwise when viewed from rear to front, and in a left-and-right direction a central axis of the hot air fan is located at a left side of a central axis of the circular portion; or the hot air fan rotates clockwise when viewed from front to rear, and in the left-and-right direction, the central axis of the hot air fan is located at a right side of the circular portion.

According to an embodiment of the present application, in an up-and-down direction, a central axis of the hot air fan is located below a central axis of the circular portion.

According to an embodiment of the present application, a distance between an outer circumferential edge of the hot air fan and an inner circumferential face of the circular portion increases gradually in a rotation direction of the hot air fan.

According to an embodiment of the present application, the heating member is coiled in the circular portion.

According to an embodiment of the present application, the heating device includes a heating member and a hot air fan, the heating cavity has a front surface provided with a heating-cavity air inlet, the heating-cavity air inlet includes air holes, and at least a part of the plurality of air holes is opposite to the heating member in a front-and-rear direction.

According to an embodiment of the present application, the food container fits with the cooking cavity in a pull-push manner between a closed position where the food container closes the cooking cavity and a separation position where the food container is separated from the cooking cavity.

According to an embodiment of the present application, the food container includes an outer container, the outer container fitting with the cooking cavity in a pull-push manner between a closed position where the outer container closes the cooking cavity and a separation position where the outer container is separated from the cooking cavity; and an inner container detachably fitted in the outer container, and the inner container having a bottom wall provided with a container air inlet and a rear wall provided with a container air outlet.

Additional embodiments of the present application will be given in part in the following descriptions, become apparent in part from the following descriptions, or be learned from the practice of the present application.

BRIEF DESCRIPTION OF THE DRAWINGS

Embodiments of the present application will become apparent and more readily appreciated from the following descriptions made with reference to the drawings, in which.

Reference numerals: air fryer 1, housing 100, accommodating cavity 101, heating device 102, food container 103, partition wall 110, cooking cavity 120, heating cavity 130, heating member 131, hot air fan 132, heating-cavity air outlet 133, sub air outlet 1330, air blocking piece 1331, heating-cavity air inlet 134, air hole 1340, vertical portion 135, circular portion 136, partition plate 140, drive device 150, electric motor shaft 151, thermal insulation plate 160, cooling fan 170, thermovent 180, frying basket 200; container air inlet 210; container air outlet 220; frying barrel 300, air guiding edge 310, food to be fried 2, length b of the air guiding edge in a front-and-rear direction, height a of the air guiding edge in an up-and-down direction, minimum angle c between a tangent line at a rear end of the air guiding edge and a horizontal direction, distance d between an outer circumferential edge of the hot air fan and an inner circumferential face of the circular portion.

DETAILED DESCRIPTION OF THE DISCLOSURE

Embodiments of the present application are based on discoveries of the following facts and problems.

In air fryers of the related art, a fan is arranged behind a frying basket. The fan directly blows heat produced by a heating member to a rear portion of the frying basket, which causes that temperature at the rear portion of the frying basket is higher than a front portion. The food to be fried located at the rear portion of the frying basket is directly blown by the hot air, the rate at which moisture is lost and the food is heated is significantly faster than the food to be fried at the front portion, affecting temperature uniformity in the frying basket and affecting cooking effect of the food.

Embodiments of the present application will be described in detail and examples of the embodiments will be illustrated in the drawings, where same or similar reference numerals are used to indicate same or similar members or members with same or similar functions. The embodiments described herein with reference to drawings are explanatory, illustrative, and only used to generally understand the present application. The embodiments shall not be construed to limit the present application.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not require that the present application be constructed or operated in a particular orientation. In addition, the feature defined with "first" and "second" may comprise one or more of this feature. In the description of the present application, the term "a plurality of" means two or more than two, unless specified otherwise.

In the description of the present application, unless specified or limited otherwise, it should be noted that, terms "mounted," "connected" and "coupled" may be understood broadly, such as permanent connection or detachable connection, electronic connection or mechanical connection, direct connection or indirect connection via intermediary, inner communication or interaction between two elements. The above terms can be understood according to specific situations.

An air fryer 1 according to embodiments of the present application will be described below with reference to the drawings.

As illustrated in FIGS. 1 to 11, the air fryer 1 according to embodiments of the present application includes a housing 100, a heating device 102 and a food container 103.

The housing 100 defines a cooking cavity 120 and a heating cavity 130, the heating cavity 130 is located behind the cooking cavity 120 (an up-and-down direction, a left-and-right direction, a front-and-rear direction are shown by arrows in the drawings, the directions shown in the drawings are only for convenience of expression and not limitation to the actual arrangement directions of the present application), and a lower portion of the heating cavity 130 is provided with a heating-cavity air outlet 133. The heating device 102 is arranged in the housing 100 to heat the cooking cavity 120. The food container 103 is configured to receive food to be fried 2, the food container 103 is adapted to be placed in the cooking cavity 120, and a rear end of the food container 103 is provided with an air guiding edge 310. When the food container 103 is placed in the cooking cavity 120, the air guiding edge 310 is located below the heating-cavity air outlet 133 to guide airflow from the heating-cavity air outlet 133 to the food container 103. The air guiding edge 310 obliquely extends rearwards and upwards in the front-and-rear direction, and a ratio of a length b of the air guiding edge 310 in the front-and-rear direction to a height a of the air guiding edge 310 in the up-and-down direction is 1~5.

The air guiding edge 310 may be a flat plate or arc plate structure that extends rearwards and upwards from the rear end of the food container 103, and can guide the passing hot air.

In the air fryer 1 according to embodiments of the present application, by providing the heating-cavity air outlet 133 in a lower surface of the heating cavity 130 and providing the air guiding edge 310 on the food container 103, hot air may be blown downwards via the heating-cavity air outlet 133 and then the hot air may be guided to the food container 103 by the air guiding edge 310. Compared to an air fryer in the related art, hot air can be prevented from being directly blown to the food to be fried 2 at a rear portion of the food container 103, significant difference in crisping speeds and heating speeds of the food to be fried 2 at front and rear portions of the food container 103 may be avoided, temperature in the food container 103 may be more uniform, the crisping speed at front and rear portions of the food container 103 may be more consistent, and the cooking effect of the food container 103 may be improved.

In one embodiment, the air guiding edge 310 obliquely extends upwards and rearwards, and thus, after the hot air is blown out from the heating-cavity air outlet 133, the airflow can be guided forwards by an inclined face constructed by the air guiding edge 310, and the hot air can enter the front portion of the food container 103 more easily, the hot air can enter the food container 103 more evenly, and the uniformity of heating and crisping in the food container 103 is further improved.

In one embodiment, the air guiding edge 310 obliquely extends upwards and rearwards, and the air guiding edge 310 obliquely extends upwards and rearwards from the rear end of a bottom wall of the food container 103 to below the heating-cavity air outlet 133, and thus, the hot air blown out from the heating-cavity air outlet 133 is blown to the air guiding edge 310, and a forward component force is produced under the action of an inclined surface of the air guiding edge 310 to guide the hot air forwards. Further, the ratio of the length of the air guiding edge 310 in the front-and-rear direction to the height of the air guiding edge 310 in the up-and-down direction is set to be greater than or equal to 1 and less than or equal to 5, an angle of inclination of the air guiding edge 310 can be defined, insufficient contact of the hot air with the air guiding edge 310 due to too large angle of the air guiding edge 310, which makes part of the hot air difficult to be guided to rear portion of the food container 103 by the air guiding edge 310, can be avoided, meanwhile it is avoided that the hot air is not easy to go deep into the rear portion of the food container 103 due to the too small angle of the air guiding edge 310, and temperature difference at places in the food container 103 is less than 20 degrees Celsius, and uniformity of the temperature in the food container 103 is further ensured.

Therefore, the air fryer 1 according to embodiments of the present application has embodiments configured for even heating, good cooking effect, etc.

The air fryer 1 according to some embodiments of the present application will be described below with reference to the drawings.

In some embodiments of the present application, as illustrated in FIGS. 1 to 11, the air fryer 1 according to embodiments of the present application includes a housing 100, a heating device 102 and a food container 103.

Figure 1:
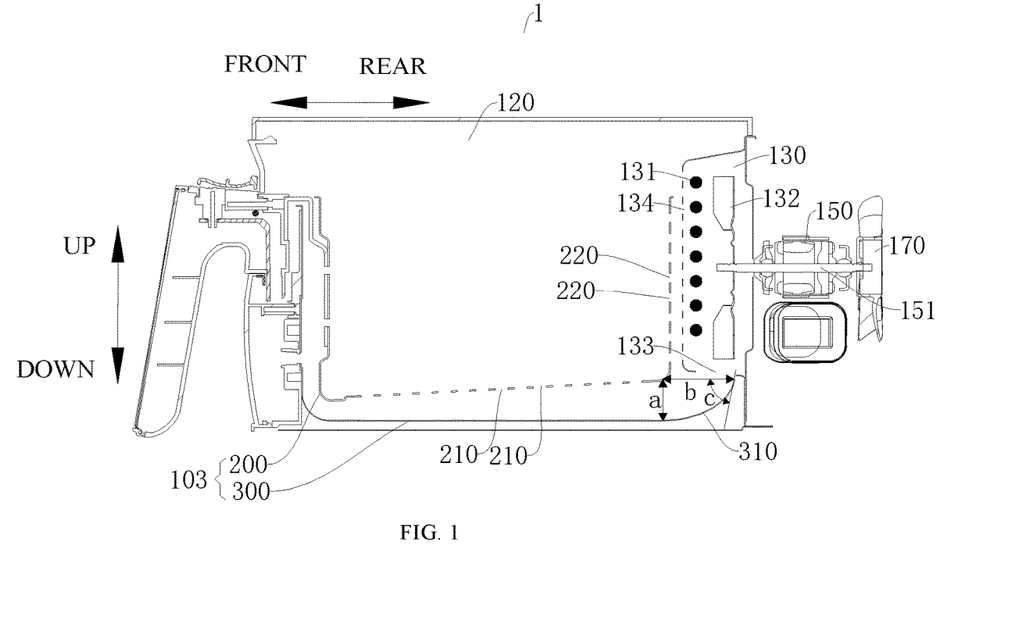
FIG. 1 is a sectional view of an air fryer according to an embodiment of the present application.

In one embodiment, as illustrated in FIG. 1, the air guiding edge 310 obliquely extends upwards and rearwards from the rear end of a bottom wall of the food container 103 to below the heating-cavity air outlet 133, the hot air blown out from the heating-cavity air outlet 133 is blown to the air guiding edge 310, and a forward component force is produced under the action of an inclined surface of the air guiding edge 310 to guide the hot air forwards. Further, the ratio of the length b of the air guiding edge 310 in the front-and-rear direction to a height a of the air guiding edge 310 in the up-and-down direction is set to be 2~4. Thus, the angle of inclination of the air guiding edge 310 may be further limited, and the guiding effect of the air guiding edge 310 on the hot air is further improved, and temperature difference at places in the food container 103 is less than 10 degrees Celsius, and uniformity of the temperature in the food container 103 is further ensured.

In one embodiment, as illustrated in FIG. 1, in order to guide the hot air by an arc surface of the air guiding edge 310, the air guiding edge 310 extends rearwards and upwards in an arc shape, and a minimum angle c between a tangent line at a rear end of the air guiding edge 310 and a horizontal direction is 45~90 degrees. Thus, the hot air may be dispersed by the arc surface to further improve distribution uniformity of the hot air. In one embodiment, bending degree of the air guiding edge 310 can be limited by limiting the angle of the tangent line at the rear end of the air guiding edge 310, and the structure of the air guiding edge 310 is more reasonable, and the angle of the tangent line at the rear end of the air guiding edge 310 is prevented from being too large or too small to affect guiding of the hot air.

In one embodiment, when the air guiding edge 310 extends rearwards and upwards in an arc shape, and the minimum angle c between the tangent line at the rear end of the air guiding edge 310 and the horizontal direction is 45 degrees, the ratio of the length b of the air guiding edge 310 in the front-and-rear direction to the height a of the air guiding edge 310 in the up-and-down direction is 1~4. When the minimum angle c between the tangent line at the rear end of the air guiding edge 310 and the horizontal direction is 90 degrees, the ratio of the length b of the air guiding edge 310 in the front-and-rear direction to the height a of the air guiding edge 310 in the up-and-down direction is 2~4. Thus, temperature difference at places in the food container 103 may be less than 10 degrees Celsius.

In one embodiment, the ratio of the length b of the air guiding edge 310 in the front-and-rear direction to the height a of the air guiding edge 310 in the up-and-down direction is 2.5~3.5, and possibly 3. The minimum angle c between the tangent line at the rear end of the air guiding edge 310 and the horizontal direction is 50~70 degrees, and possibly 60 degrees. Thus, the angle of inclination of the air guiding edge 310 may be further limited, and the guiding effect of the air guiding edge 310 on the hot air is further improved, and temperature difference at places in the food container 103 is less than 10 degrees Celsius, the structure of the air guiding edge 310 is more reasonable, the angle of the tangent line at the rear end of the air guiding edge 310 is prevented from being too large or too small to affect guiding of the hot air, and uniformity of the temperature in the food container 103 is further ensured.

Figure 2:
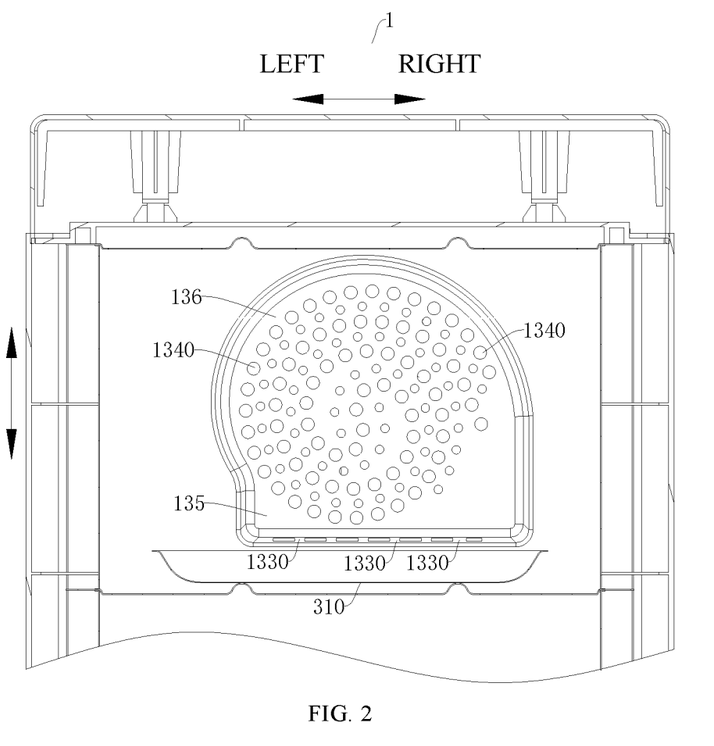
FIG. 2 is a sectional view of an air fryer according to an embodiment of the present application.
Figure 3:
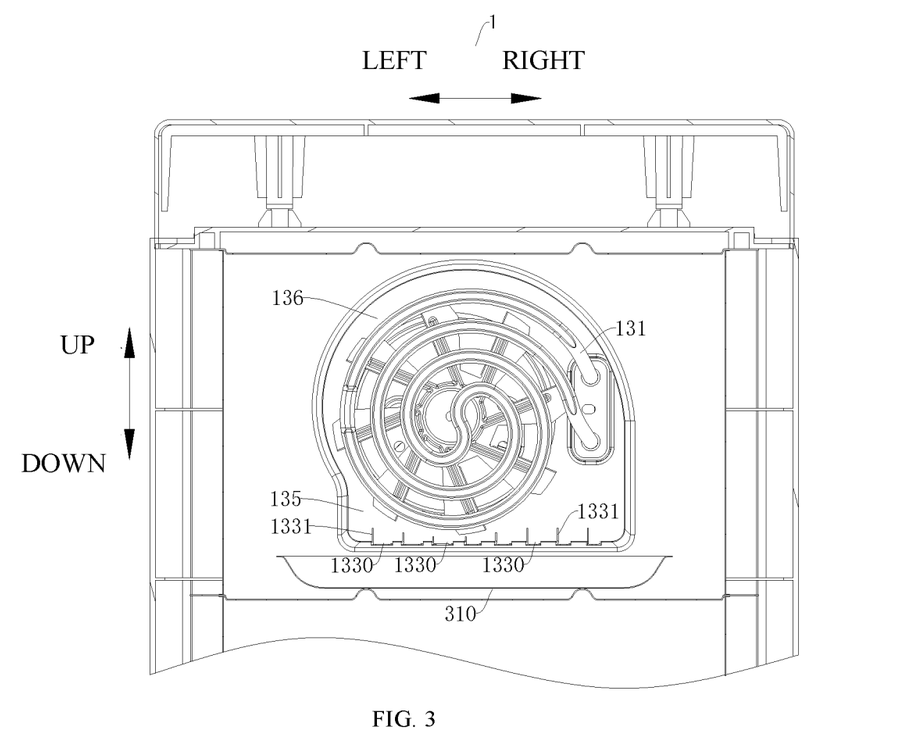
FIG. 3 is a sectional view of an air fryer according to an embodiment of the present application.
Figure 4:
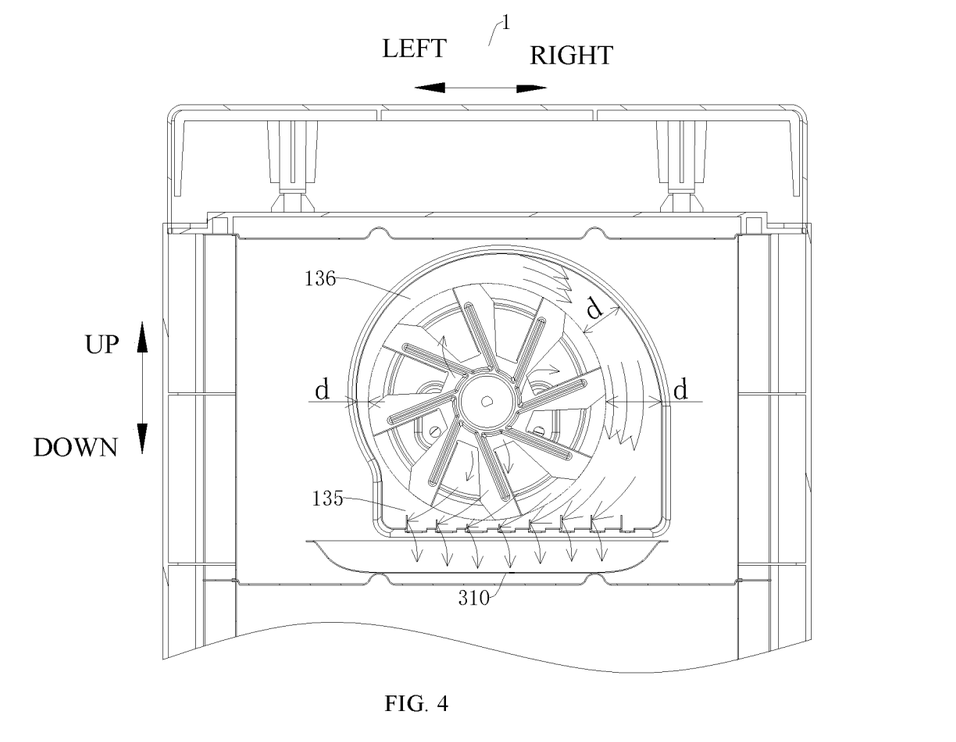
FIG. 4 is a sectional view of an air fryer according to an embodiment of the present application.
Figure 5:
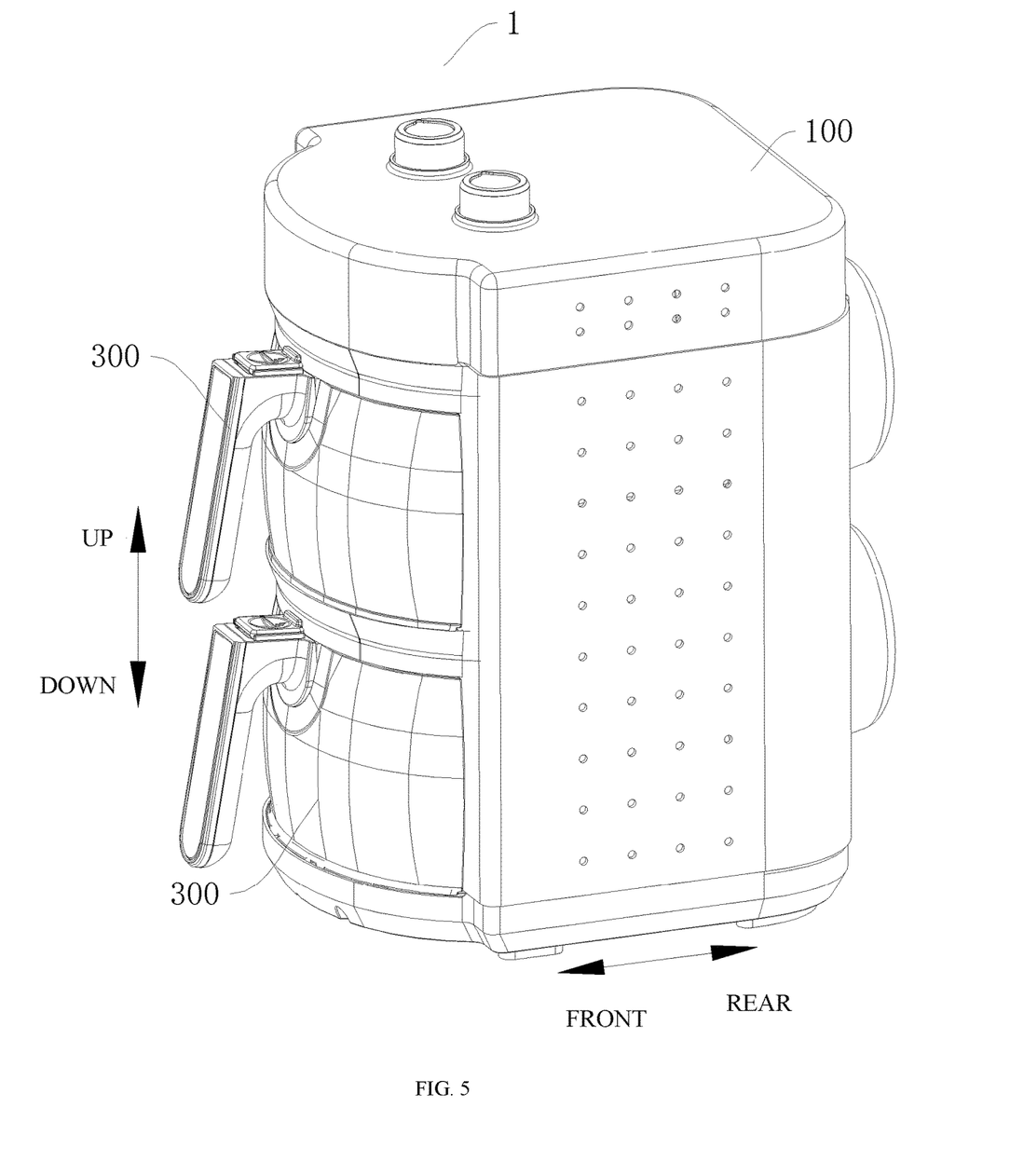
FIG. 5 is a schematic view of an air fryer according to an embodiment of the present application.
Figure 6:
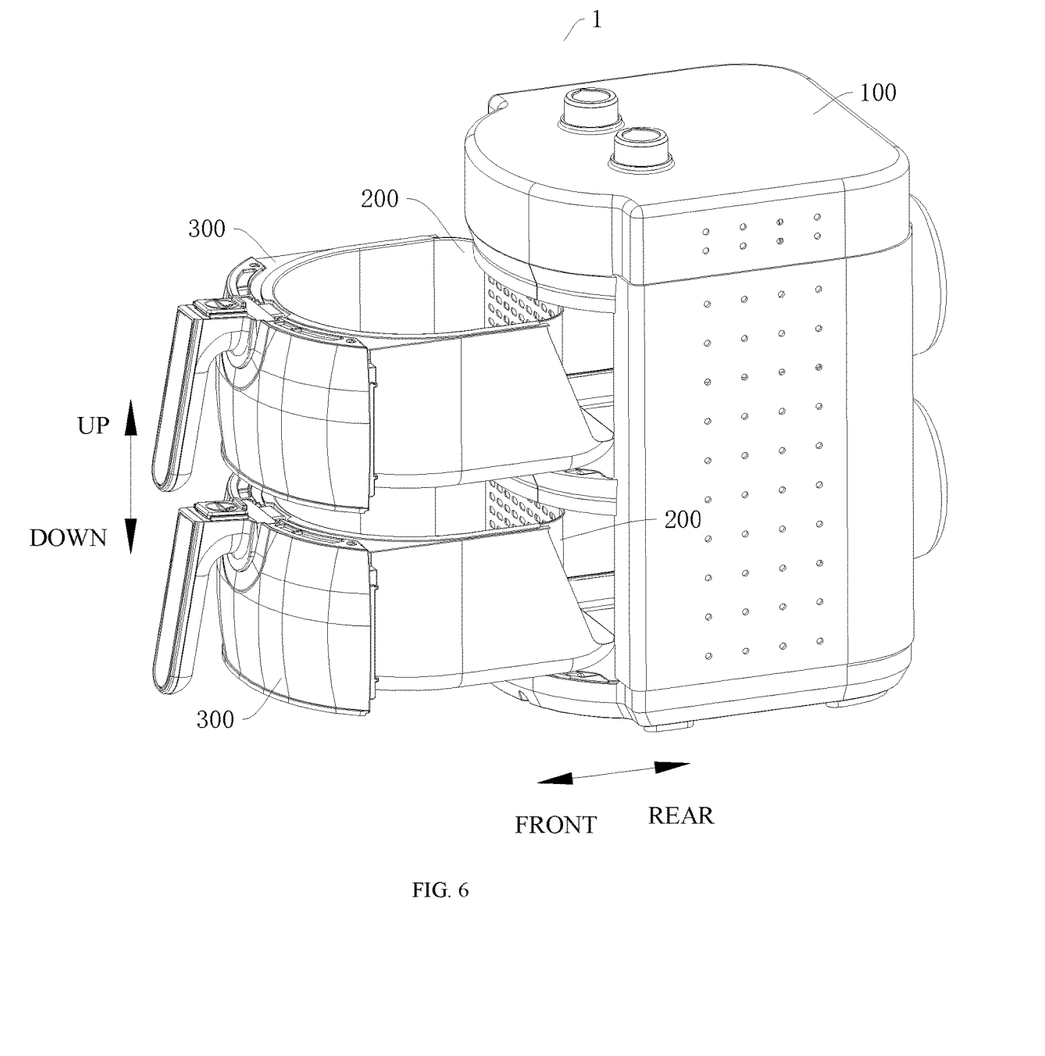
FIG. 6 is a schematic view of an air fryer according to an embodiment of the present application.

The air fryer 1 according to a specific example of the present application is illustrated in FIGS. 2-4. As illustrated in FIGS. 2 to 4, the heating device 102 includes a heating member 131 and a hot air fan 132, and a front surface of the heating cavity 130 is provided with a heating-cavity air inlet 134. In one embodiment, the heating device 102 further includes a drive device 150. The drive device 150 may be an electric motor, and an electric motor shaft 151 of the electric motor is drivingly coupled to the hot air fan 132. Thus, the heating member 131 can be used to produce heat, and the hot air fan 132 may be used to blow the heat out from the heating cavity 130, and cold air is introduced via the front surface of the heating cavity 130, heated by the heating member 131, and blown out from below the heating cavity 130 by the hot air fan 132.

In one embodiment, as illustrated in FIGS. 2 to 4, the heating-cavity air outlet 133 includes sub air outlets 1330, and the plurality of sub air outlets 1330 are spaced apart in the left-and-right direction. Thus, the hot airflow can be further dispersed, and it can avoid the hot airflow being too concentrated, which may lead to nonuniform heating and crisping effect.

In one embodiment, as illustrated in FIGS. 3 and 4, each sub air outlet 1330 is provided with an air blocking piece 1331 extending upwards. Thus, airflow rotates in the heating cavity 130 under the drive of the hot air fan 132, and is blocked by the air blocking piece 1331 when passing through the heating-cavity air outlet 133; the hot airflow generates a reverse and downwards component force, and is discharged via the sub air outlet 1330. Blocking and guiding of the hot air can further disturb the airflow, to avoid formation of thermal boundary layer and to further improve the uniformity of the temperature in the food container 103.

In one embodiment, as illustrated in FIGS. 3 and 4, the air blocking piece 1331 is located at a left edge or a right edge of each sub air outlet 1330. Thus, the air blocking piece 1331 may be used to fully block the airflow at a side of each sub air outlet 1330, and help the smooth passage of the airflow from the other side.

In one embodiment, as illustrated in FIGS. 3 and 4, the hot air fan 132 rotates clockwise when viewed from rear to front, and the air blocking piece 1331 is located at the left edge of each sub air outlet 1330. Or, the hot air fan 132 rotates clockwise when viewed from front to rear, and the air blocking piece 1331 is located at the right edge of each sub air outlet 1330. Thus, the air blocking piece 1331 may be located at a side of each sub air outlet 1330 away from a windward side, and when the airflow flows in a rotation direction of the hot air fan 132, the airflow is rebounded by blocking of the air blocking piece 1331 and flows out in a reverse and downward direction, to avoid direct blowing of the airflow and to improve uniformity of the hot air.

In one embodiment, as illustrated, the length of each air blocking piece 1331 in the vertical direction increases gradually from inside to outside. Thus, on the one hand, the air blocking piece 1331 may better fit the shape of the hot air fan 132 to leave sufficient flowing room for the airflow; and on the other hand, blocking effect at the two sides may be improved to further improve uniformity of the airflow.

The air fryer 1 according to some embodiment of the present application is illustrated in FIGS. 2-4. As illustrated in FIGS. 2 to 4, the heating cavity 130 includes a vertical portion 135 and a circular portion 136. The heating-cavity air outlet 133 is defined in a lower surface of the vertical portion 135. The circular portion 136 is arranged above the vertical portion 135 and is coupled to the vertical portion 135, and the heating member 131 and the hot air fan 132 are arranged in the circular portion 136. Thus, arrangement of the heating member 131 and the hot air fan 132 may be facilitated, and discharge of the airflow may be facilitated.

In one embodiment, as illustrated in FIG. 4, a central axis of the hot air fan 132 and a central axis of the circular portion 136 are misaligned. Thus, the hot air fan 132 may be eccentrically arranged in the circular portion 136, to improve efficiency of the hot air fan 132 to drive the airflow in the heating cavity 130.

In one embodiment, as illustrated in FIG. 4, the hot air fan 132 rotates clockwise when viewed from rear to front, and in the left-and-right direction, the central axis of the hot air fan 132 is located at a left side of central axis of the circular portion 136. Or, the hot air fan 132 rotates clockwise when viewed from front to rear, and in the left-and-right direction, the central axis of the hot air fan 132 is located at a right side of the central axis of the circular portion 136. Thus, the efficiency of the hot air fan 132 to drive the airflow in the heating cavity 130 may be further improved.

Further, as illustrated in FIG. 4, in the up-and-down direction, the central axis of the hot air fan 132 is located below the central axis of the circular portion 136. Thus, the efficiency of the hot air fan 132 to drive the airflow in the heating cavity 130 can also be further improved.

In one embodiment, as illustrated in FIG. 4, the hot air fan 132 is eccentrically arranged in the circular portion 136. In one embodiment, in order to enhance air supply effect of the hot air fan 132, the central axis of the hot air fan 132 is located at a lower left of the central axis of the circular portion 136. Further, starting from a lower left portion of the circular portion 136, a distance d between an outer circumferential edge of the hot air fan 132 and an inner circumferential face of the circular portion 136 increases gradually in the rotation direction of the hot air fan 132. Thus, a width of a channel through which airflow passes increases gradually along the rotation direction of the hot air fan 132, to further improve the efficiency of the hot air fan 132 to drive the airflow in the heating cavity 130.

In one embodiment, as illustrated in FIG. 3, the heating member 131 is coiled in the circular portion 136. Thus, the arrangement of the heating member 131 can be facilitated, and the heating efficiency of the heating member 131 can be improved.

Further, as illustrated in FIG. 2, the heating-cavity air inlet 134 includes air holes 1340, and at least a part of air holes 1340 is opposite to the heating member 131 in the front-and-rear direction. Thus, the airflow can be fully heated by the heating member 131 after entering from air holes 1340, and heating effect of the heating member 131 can be improved.

In one embodiment, the hot air fan 132 is a centrifugal or axial fan.

The air fryer 1 according to a specific example of the present application is illustrated in FIGS. 1-8. As illustrated in FIGS. 1 and 5-8, the food container 103 fits with the cooking cavity 120 in a pull-push manner between a closed position where the food container closes the cooking cavity 120 and a separation position where the food container is separated from the cooking cavity 120. Thus, the opening and closing of the cooking cavity 120 may be facilitated.

It could be understood herein that, the food container 103 includes but is not limited to a frying basket, a frying barrel, or a carrier plate.

In one embodiment, as illustrated in FIG. 1, the food container 103 includes an outer container and an inner container. The outer container fits with the cooking cavity 120 in a pull-push manner between a closed position where the outer container closes the cooking cavity 120 and a separation position where the outer container is separated from the cooking cavity 120, and the air guiding edge 310 is arranged on the outer container. The inner container is detachably fitted in the outer container, a bottom wall of the inner container is provided with a container air inlet 210 and a rear wall of the inner container is provided with a container air outlet 220. Thus, opening and closing of the cooking cavity 120 may be facilitated, cleaning of the food container 103 may be facilitated, entrance of the air may be facilitated, and leakage of fat may be facilitated.

In one embodiment, the outer container and the inner container may also be a frying basket and a carrier plate, or a frying barrel and a carrier plate, respectively. Choices may be made regarding combination according to actual needs.

In one embodiment, the outer container is a frying barrel 300 and the inner container is a frying basket 200.

The air fryer 1 according to other embodiments of the present application are illustrated in FIGS. 5-8. As illustrated in FIGS. 5 to 8, the housing 100 defines accommodating cavities 101. Each accommodating cavity 101 is provided with a partition wall 110 therein, and the partition wall 110 divides the accommodating cavity 101 where it is located into the heating cavity 130 and the cooking cavity 120. Food containers 103 are provided, and food containers are adapted to be placed in cooking cavities 120 respectively. Heating devices 102 are provided, and the plurality of heating devices 102 are arranged in the plurality of heating cavities 130 respectively and heat the plurality of cooking cavities 120 respectively.

In the air fryer 1 according to embodiments of the present utility model, by providing food containers 103, foods to be fried 2 may be separately placed in the plurality of food containers 103, to prevent taint of odor caused by contact of different foods with each other. Hence, the air fryer 1 may cook different foods at the same time and it is less prone to taint of odor to improve cooking efficiency of the air fryer 1; and a process of purchasing air fryers by a user may be omitted, to make the usage of the user more convenient.

Furthermore, by providing the plurality of cooking cavities 120 and placing the plurality of food containers 103 in the plurality of cooking cavities 120 respectively, different foods may be placed in different cooking cavities 120 respectively. Hence, mutual taint of odor between the foods in different cooking cavities 120 are prevented, occurrence of taint of odor is further prevented when the air fryer 1 cooks different foods, and the user can further conveniently cook different foods at the same time, to improve cooking efficiency of the air fryer 1.

Additionally, by providing a heating device 102 in different accommodating cavities 101 separately, the plurality of cooking cavities 120 may be further prevented from sharing one heating device 102 and causing taint of odor between different foods. In one embodiment, when the heating device 102 is a hot air device, the hot air may be prevented from circulating between the plurality of cooking cavities 120, to further avoid taint of odor.

In one embodiment, as illustrated in FIGS. 5 to 8, the plurality of accommodating cavities 101 are isolated from each other. Thus, by providing the plurality of separated accommodating cavities 101 and the plurality frying baskets 200, the plurality of frying baskets 200 containing the food to be fried 2 may be placed in the plurality of separated cooking cavities 120, respectively. Therefore, the different cooking cavities 120 isolated from each other may be used to cook different foods to be fried 2, to further avoid taint of odor between different foods.

In one embodiment, as illustrated in FIGS. 5 to 8, the plurality of accommodating cavities 101 are ranged in the up-and-down direction. Thus, space occupied by the air fryer 1 in the horizontal direction may be reduced, which is more in line with the user's home kitchen placement habits.

In one embodiment, as illustrated in FIGS. 5 to 8, two accommodating cavities 101 are provided, and the two accommodating cavities 101 are separated by a partition plate 140. Thus, two different foods may be cooked separately, and overall cost of the air fryer 1 may be saved and overall height of the air fryer 1 may be reduced.

FIGS. 5-8 illustrates an air fryer 1 according to a specific example of the present utility model. As illustrated in FIGS. 5 to 8, the front surface of each accommodating cavity 101 is open, and in each accommodating cavity 101, the heating cavity 130 is located behind the cooking cavity 120. Thus, the cooking cavity 120 and the heating cavity 130 may be distributed in the front-and-rear direction, sizes of the air fryer 1 in the vertical direction and the left-and-right direction may be controlled conveniently, and the air fryer 1 has more beautiful appearance, and is more in line with modern home kitchen placement habits.

In one embodiment of the present utility model, the plurality of food containers 103 are fitted with the plurality of cooking cavities 120 in one-to-one correspondence, and the food container 103 fits with the corresponding cooking cavity 120 in a pull-push manner between a closed position where the food container closes the cooking cavity 120 and a separation position where the food container is separated from the cooking cavity 120.

In some other embodiments of the present utility model, outer containers are provided, and the plurality of outer containers are fitted with the plurality of cooking cavities 120 in one-to-one correspondence, each outer container fits with a corresponding cooking cavity 120 in a pull-push manner between a closed position where the outer container closes the cooking cavity 120 and a separation position where the outer container is separated from the cooking cavity 120, and the plurality of food containers are detachably fitted in the plurality of outer containers in one-to-one correspondence.

For example, the outer container is a frying barrel 300, and the inner container is a frying basket 200.

Figure 7:
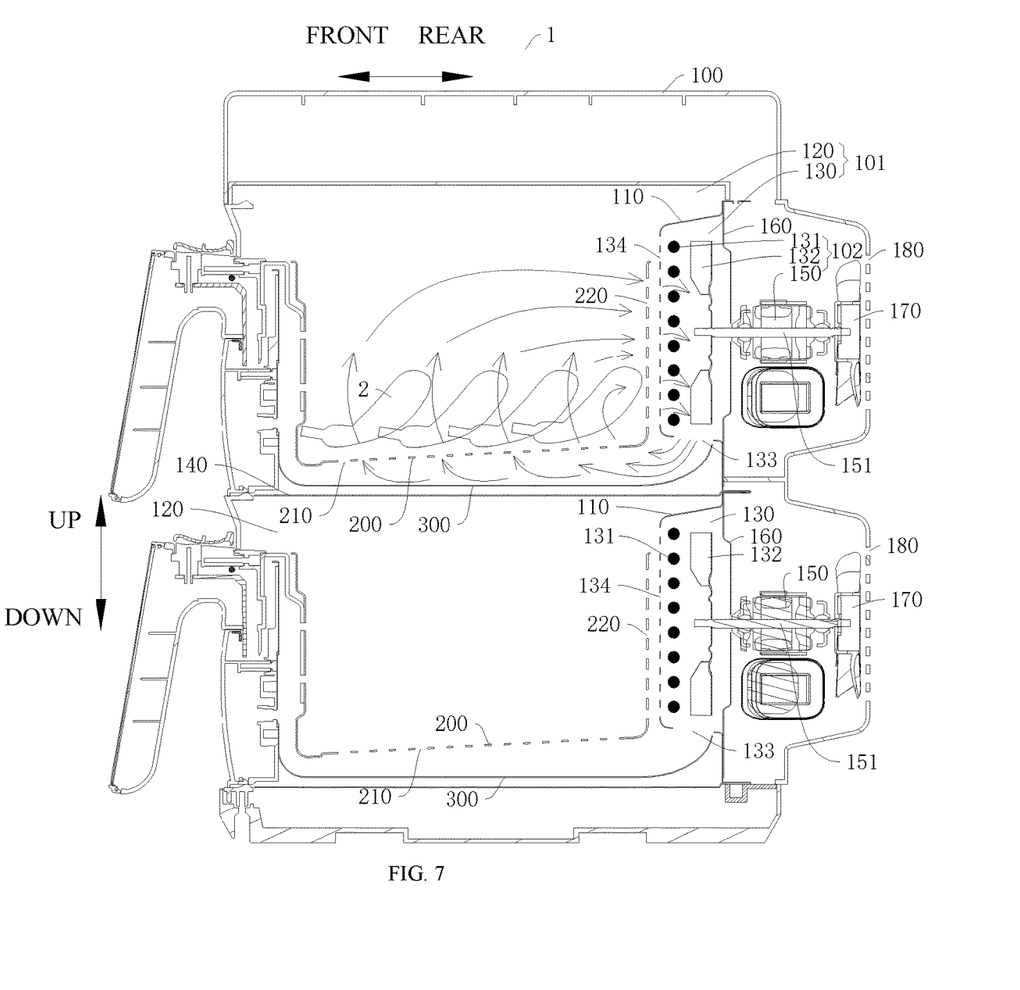
FIG. 7 is a sectional view of an air fryer according to an embodiment of the present application.

In one embodiment, as illustrated in FIG. 7, a bottom wall of the frying basket 200 obliquely extends upwards from front to rear. Thus, sufficient airflow can be ensured to enter the frying basket 200, resistance to the inlet air of the frying basket 200 is reduced, and cooking effect of the food to be fried 2 in the frying basket 200 is ensured.

FIGS. 5-8 illustrate a specific example according to the present utility model. As illustrated in FIGS. 5 to 8, the plurality of frying barrels 300 are fitted with the plurality of cooking cavities 120 in one-to-one correspondence, each frying barrel 300 fits with a corresponding cooking cavity 120 in a pull-push manner between a closed position and the frying barrel closes the cooking cavity 120 and a separation position where the frying barrel is separated from the cooking cavity 120, and the plurality of frying baskets 200 are detachably fitted in the plurality of frying barrels 300 in one-to-one correspondence. Thus, the user is convenient to pick and place the frying basket 200, and the frying barrel 300 may be used to collect fat and residue produced by the food to be fried 2 in the cooking process, to facilitate cleaning by the user and to improve user's comfort during usage.

Figure 8:
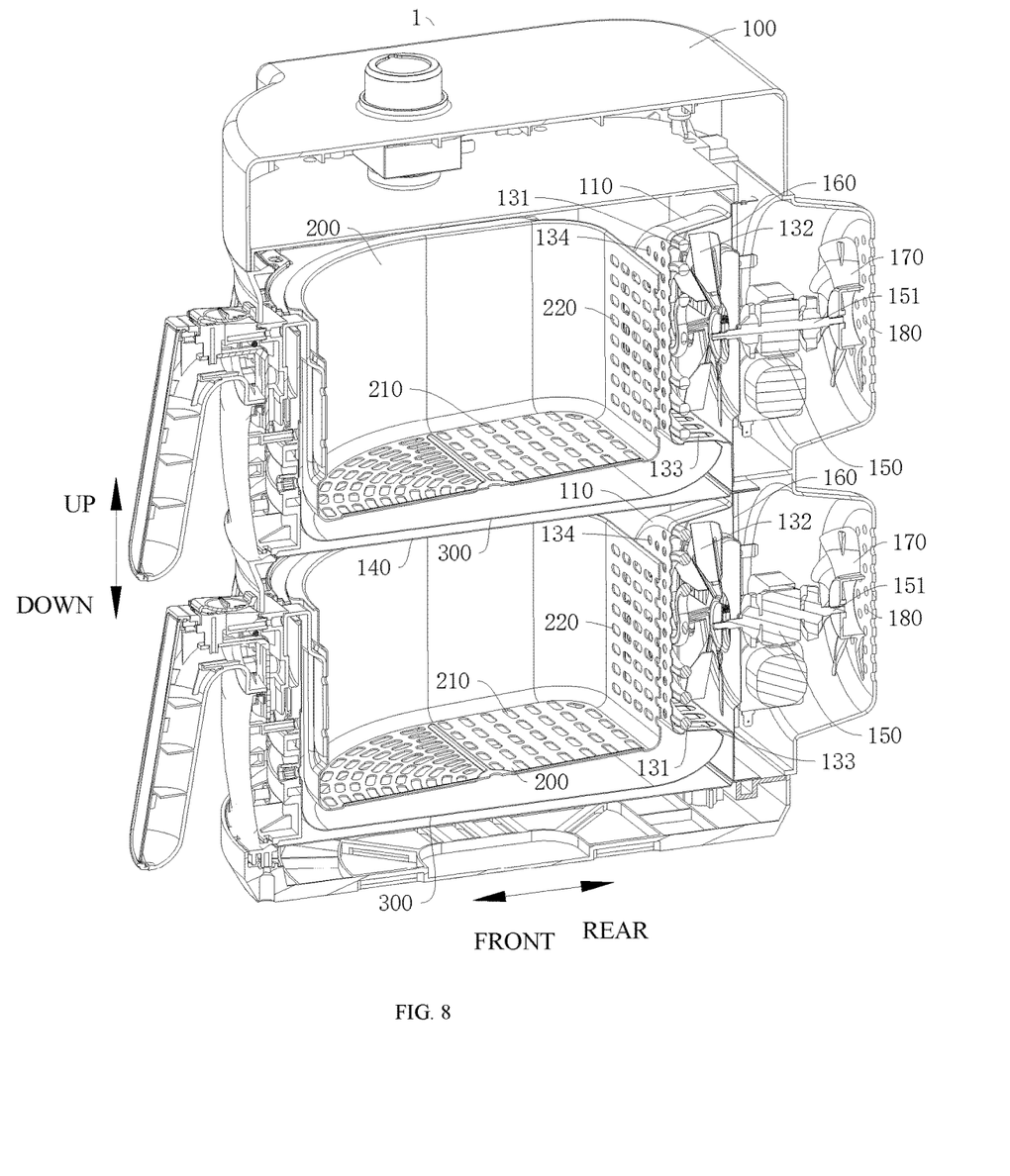
FIG. 8 is a partial schematic view of an air fryer according to an embodiment of the present application.
Figure 9:
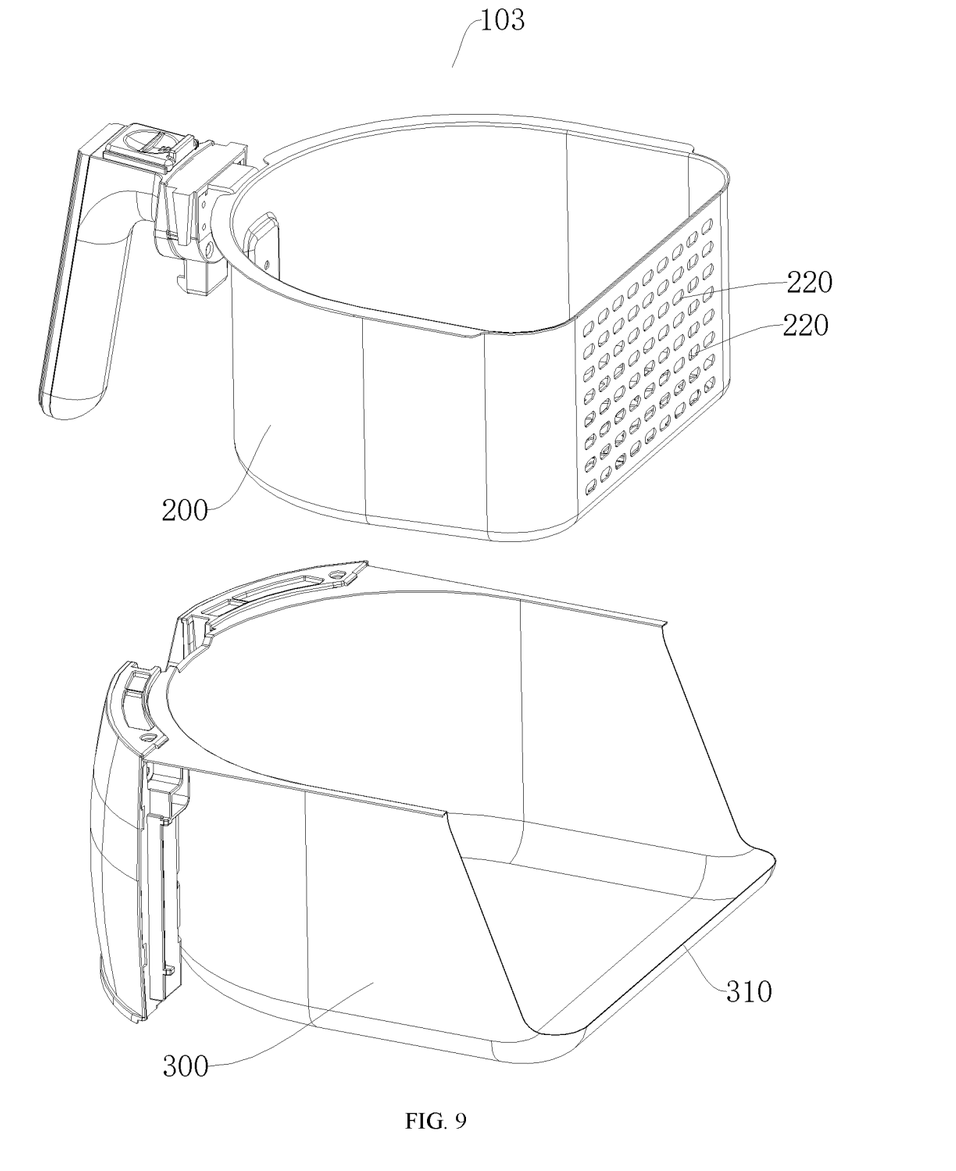
FIG. 9 is a schematic view of a food container of an air fryer according to an embodiment of the present application.
Figure 10:
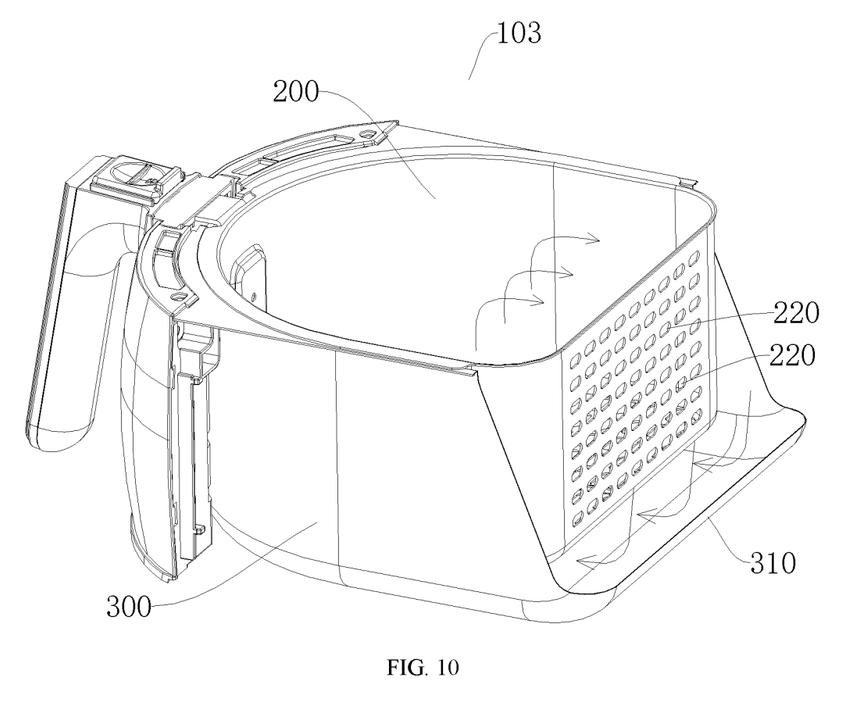
FIG. 10 is a schematic view of a food container of an air fryer according to an embodiment of the present application.

In one embodiment, as illustrated in FIGS. 7 and 8, an inner surface of the frying barrel 300 is spaced apart from the bottom wall of the frying basket 200 inside it, a lower end of the heating cavity 130 is spaced apart from the bottom wall of the accommodating cavity 101 where it is located, and when the frying barrel 300 is located in the closed position the rear end of the frying barrel 300 extends to below the heating cavity 130. Thus, reliable circulation of the airflow in the cooking cavity 120 may be ensured.

In one embodiment, as illustrated in FIGS. 7 and 8, each heating device 102 further includes a drive device 150, the drive device 150 is configured to drive the hot air fan 132 in the accommodating cavity 101 where it is located, and a thermal insulation plate 160 is arranged between the drive device 150 and the hot air fan 132. Thus, the drive device 150 may be used to drive hot air fan 132, and the thermal insulation plate 160 may prevent the hot air from affecting normal work of the drive device 150.

In one embodiment, as illustrated in FIGS. 7 and 8, the drive device 150 is an electric motor, an electric motor shaft 151 of the electric motor has an end coupled to the hot air fan 132 and the other end coupled to a cooling fan 170, and the housing 100 is provided with a thermovent 180 arranged close to the cooling fan 170. Thus, the cooling fan 170 may be used to cool the drive device 150, to ensure operational reliability of the drive device 150.

In one embodiment, the electric motor is a shade-pole motor and has a speed of 1000-3600 RPM (revolutions per minus). Thus, reliable circulation of the hot air in the cooking cavity 120 may be ensured.

In one embodiment, the electric motor has a speed of 2000-3000 RPM. Thus, circulation of the hot air in the cooking cavity 120 may be further ensured.

The hot air fan 132 is a stainless-steel fan. Thus, structural strength of the hot air fan 132 may be ensured, and liquid or residue produced by the food to be fried 2 may be prevented from rusting the hot air fan 132, to improve reliability of the hot air fan 132.

In one embodiment, the heating member 131 is an electrical heated tube and has a power of 800-1500 W. Thus, the heating effect of the heating member 131 may be ensured.

In one embodiment, the upper surface of the housing 100 is provided with a controller configured to control operational power and time of the heating device 102.

Figure 11:
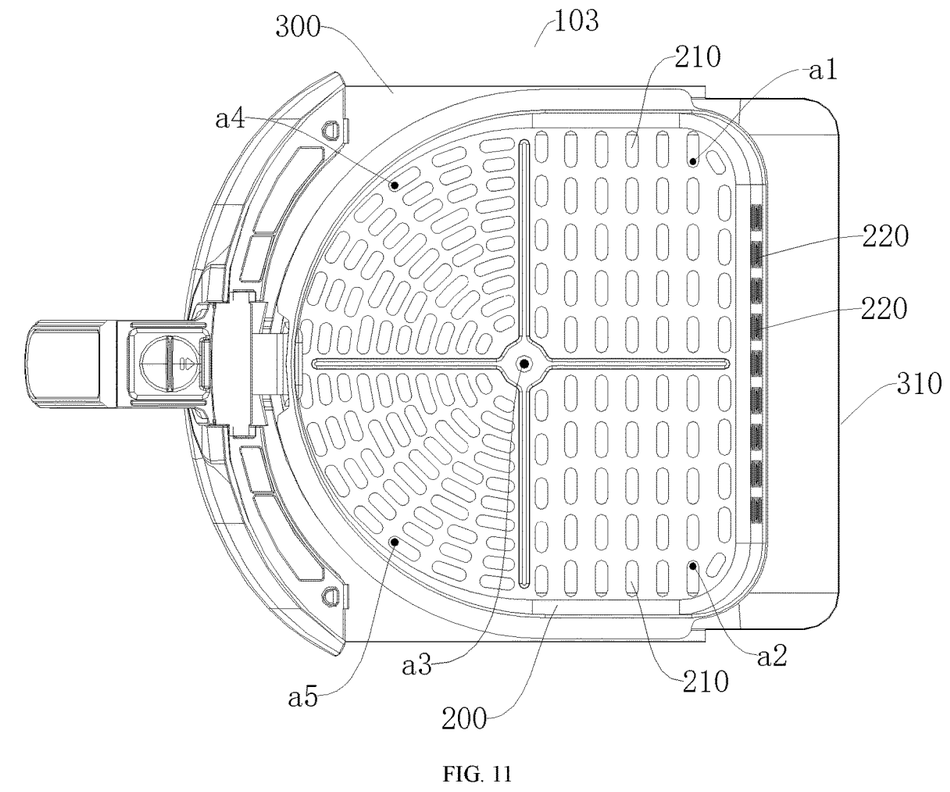
FIG. 11 is a schematic view of a food container of an air fryer according to an embodiment of the present application.

In order to verify temperature uniformity of the air fryer 1 according to embodiments of the present application, temperatures at places a1, a2, a3, a4, and a5 in the food container 103 of the air fryer 1 in heating state have been measured. In one embodiment, as illustrated in FIG. 11, a1 is located at a right rear of the food container 103, a2 is located at a left rear of the food container 103, a3 is located at a middle of the food container 103, a4 is located at a right front of the food container 103, and a5 is located at a left front of the food container 103. The results are shown in the following table:

| | | temperature field data (° C.) | | | | | | |
|---|---|---|---|---|---|---|---|---|
| λ | c | a1 | a2 | a3 | a4 | a5 | average temperature | temperature difference |
| 6 | 45° | 210 | 208 | 198 | 178 | 176 | 194 | 34 |
| 5 | 45° | 209 | 212 | 202 | 198 | 199 | 204 | 14 |
| 4 | 45° | 209 | 212 | 208 | 205 | 203 | 207 | 9 |
| 3 | 45° | 216 | 209 | 212 | 205 | 205 | 209 | 11 |
| 2 | 45° | 213 | 212 | 215 | 209 | 211 | 212 | 6 |
| 1 | 45° | 212 | 209 | 205 | 203 | 204 | 207 | 9 |
| 0.75 | 45° | 212 | 209 | 187 | 176 | 170 | 191 | 42 |
| 0.5 | 45° | 212 | 209 | 177 | 160 | 155 | 183 | 57 |
| 0.25 | 45° | 212 | 209 | 165 | 151 | 148 | 177 | 64 |
| 6 | 30° | 212 | 209 | 186 | 156 | 150 | 183 | 62 |
| 5 | 30° | 211 | 210 | 175 | 149 | 152 | 179 | 61 |
| 4 | 30° | 208 | 211 | 185 | 157 | 160 | 184 | 51 |
| 3 | 30° | 214 | 209 | 169 | 148 | 145 | 177 | 69 |
| 2 | 30° | 211 | 208 | 173 | 160 | 162 | 183 | 13 |
| 1 | 30° | 216 | 214 | 184 | 170 | 173 | 191 | 46 |
| 0.75 | 30° | 215 | 207 | 180 | 149 | 161 | 182 | 54 |
| 0.5 | 30° | 213 | 202 | 173 | 159 | 152 | 180 | 61 |
| 0.25 | 30° | 214 | 204 | 172 | 157 | 160 | 181 | 54 |
| 6 | 90° | 211 | 212 | 197 | 181 | 175 | 195 | 36 |
| 5 | 90° | 212 | 210 | 200 | 197 | 202 | 204 | 13 |
| 4 | 90° | 208 | 209 | 212 | 208 | 204 | 208 | 5 |
| 3 | 90° | 212 | 210 | 210 | 209 | 208 | 210 | 4 |
| 2 | 90° | 210 | 209 | 213 | 207 | 212 | 210 | 6 |
| 1 | 90° | 213 | 212 | 206 | 201 | 199 | 206 | 12 |
| 0.75 | 90° | 209 | 207 | 184 | 170 | 169 | 188 | 40 |
| 0.5 | 90° | 213 | 201 | 174 | 159 | 150 | 183 | 61 |
| 0.25 | 90° | 210 | 207 | 160 | 149 | 135 | 177 | 54 |

It can be seen from the table that, in the air fryer 1 according to embodiments of the present application, the temperature difference in the food container 103 has a small value when the ratio of the length b of the air guiding edge 310 in the front-and-rear direction to the height a of the air guiding edge 310 in the up-and-down direction is 1~5 and the minimum angle c between the tangent line at the rear end of the air guiding edge 310 and the horizontal direction is 45~90 degrees, and the temperature uniformity of the air fryer 1 is better.

Other constitutions and operations of the air fryer 1 according to embodiments of the present application, which will not be described in detail herein.

Reference throughout this specification to "an embodiment," "some embodiments," "an illustrative embodiment" "an example," "a specific example," or "some examples," means that a particular feature, structure, material, or characteristic described in connection with the embodiment or example is included in at least one embodiment or example of the present application. Thus, the appearances of the phrases in various places throughout this specification are not necessarily referring to the same embodiment or example of the present application. Furthermore, the particular features, structures, materials, or characteristics may be combined in any suitable manner in one or more embodiments or examples.

What is claimed is:

1. An air fryer, comprising:
   a housing defining a cooking cavity and a heating cavity, the heating cavity being located behind the cooking cavity;
   a heating device arranged in the housing to heat the cooking cavity; and
   a food container configured to receive food to be fried, the food container being adapted to be placed in the cooking cavity;
   wherein the heating cavity has a lower portion provided with a heating-cavity air outlet, the food container has a rear end provided with an air guiding edge, and when the food container is placed in the cooking cavity, the air guiding edge is located below the heating-cavity air outlet to guide airflow from the heating-cavity air outlet to the food container.

2. The air fryer according to claim 1, wherein the air guiding edge obliquely extends rearwards and upwards in a front-and-rear direction.

3. The air fryer according to claim 1, wherein a ratio of a length of the air guiding edge in a front-and-rear direction to a height of the air guiding edge in an up-and-down direction is 1-5.

4. The air fryer according to claim 1, wherein a ratio of a length of the air guiding edge in a front-and-rear direction to a height of the air guiding edge in an up-and-down direction is 2-4.

5. The air fryer according to claim 1, wherein a ratio of a length of the air guiding edge in a front-and-rear direction to a height of the air guiding edge in an up-and-down direction is 2.5-3.5.

6. The air fryer according to claim 1, wherein the air guiding edge extends rearwards and upwards in an arc shape, and a minimum angle between a tangent line at a rear end of the air guiding edge and a horizontal direction is 45"90 degrees.

7. The air fryer according to claim 1, wherein the air guiding edge extends rearwards and upwards in an arc shape, and a minimum angle between a tangent line at a rear end of the air guiding edge and a horizontal direction is 50-70 degrees.

8. The air fryer according to claim 1, wherein the air guiding edge extends rearwards and upwards in an arc shape, and a minimum angle between a tangent line at a rear end of the air guiding edge and a horizontal direction is 60 degrees.

9. The air fryer according to claim 1, wherein the heating device comprises a heating member and a hot air fan, and the heating cavity has a front surface provided with a heating-cavity air inlet.

10. The air fryer according to claim 1, wherein the heating-cavity air outlet comprises a plurality of sub air outlets spaced apart in a left-and-right direction.

11. The air fryer according to claim 10, wherein each sub air outlet is provided with an air blocking piece extending upwards.

12. The air fryer according to claim 11, wherein the air blocking piece is located at a left edge or a right edge of each sub air outlet.

13. The air fryer according to claim 12, wherein the heating device comprises a heating member and a hot air fan, the hot air fan rotates clockwise when viewed from rear to front, the air blocking piece is located at the left edge of each sub air outlet; or the hot air fan rotates clockwise when viewed from front to rear, the air blocking piece is located at the right edge of each sub air outlet.

14. The air fryer according to claim 11, wherein a length of each air blocking piece in a vertical direction increases gradually from inside to outside.

15. The air fryer according to claim 1, wherein the heating device comprises a heating member and a hot air fan, and the heating cavity comprise:
   a vertical portion, the heating-cavity air outlet being defined in a lower surface of the vertical portion; and
   a circular portion located above the vertical portion and coupled to the vertical portion, the heating member and the hot air fan being arranged in the circular portion.

16. The air fryer according to claim 15, wherein a central axis of the hot air fan and a central axis of the circular portion are misaligned.

17. The air fryer according to claim 15, wherein the hot air fan rotates clockwise when viewed from rear to front, and in a left-and-right direction a central axis of the hot air fan is located at a left side of a central axis of the circular portion; or the hot air fan rotates clockwise when viewed from front to rear, and in the left-and-right direction, the central axis of the hot air fan is located at a right side of the circular portion.

18. The air fryer according to claim 15, wherein in an up-and-down direction, a central axis of the hot air fan is located below a central axis of the circular portion.

19. The air fryer according to claim 15, wherein a distance between an outer circumferential edge of the hot air fan and an inner circumferential face of the circular portion increases gradually in a rotation direction of the hot air fan.

* * * * *